(12) United States Patent
Rahman (10) Patent No.: US 12,034,778 B2
(45) Date of Patent: Jul. 9, 2024

(54) VOICE CALL SETUP IN A TELECOMMUNICATION SYSTEM

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 227 days.

(21) Appl. No.: 17/527,945

(22) Filed: Nov. 16, 2021

(65) Prior Publication Data

US 2023/0156048 A1     May 18, 2023

(51) Int. Cl.
| | | |
|---|---|---|
| *H04L 65/1069* | (2022.01) | |
| *H04B 17/318* | (2015.01) | |
| *H04L 65/1016* | (2022.01) | |
| *H04L 65/1059* | (2022.01) | |
| *H04L 65/1104* | (2022.01) | |
| *H04L 65/80* | (2022.01) | |

(52) U.S. Cl.
CPC ....... *H04L 65/1069* (2013.01); *H04B 17/318* (2015.01); *H04L 65/1016* (2013.01); *H04L 65/1059* (2013.01); *H04L 65/1104* (2022.05); *H04L 65/80* (2013.01)

(58) Field of Classification Search
CPC ............. H04L 65/1069; H04L 65/1104; H04L 65/1016; H04L 65/1059; H04L 65/80; H04B 17/318
USPC ....................................................... 709/227
See application file for complete search history.

(56) References Cited

U.S. PATENT DOCUMENTS

| | | | |
|---|---|---|---|
| 7,613,113 B1 * | 11/2009 | Croak ................. | H04Q 3/0025 370/395.2 |
| 10,028,243 B2 * | 7/2018 | Liao ..................... | H04L 65/1069 |
| 11,071,036 B2 * | 7/2021 | Mukherjee ........ | H04W 36/0022 |
| 11,159,587 B1 * | 10/2021 | Hao ....................... | H04N 7/147 |
| 11,297,112 B2 * | 4/2022 | Schmidt ................ | H04L 65/80 |
| 11,317,325 B2 * | 4/2022 | Balasubramanian ....................... | H04L 65/1016 |
| 11,503,527 B2 * | 11/2022 | Zhu ........................ | H04W 36/14 |
| 11,576,224 B2 * | 2/2023 | Aavula ................ | H04L 65/1059 |
| 11,711,732 B2 * | 7/2023 | Rink ................. | H04W 36/0083 370/331 |
| 11,792,236 B2 * | 10/2023 | Agarwal ............. | H04L 65/1069 370/352 |
| 2010/0323700 A1 * | 12/2010 | Bachmann ............ | H04W 36/14 455/436 |

(Continued)

FOREIGN PATENT DOCUMENTS

| | | | | |
|---|---|---|---|---|
| WO | WO-2018035462 A1 * | 2/2018 | ........ | H04L 65/1016 |
| WO | WO-2023025373 A1 * | 3/2023 | | |

*Primary Examiner* — Melvin H Pollack
(74) *Attorney, Agent, or Firm* — Lee & Hayes, P.C.

(57) ABSTRACT

A user equipment (UE) can determine when to send an initial request for a voice communication to an Internet Protocol (IP) Multimedia Subsystem (IMS) core of a telecommunication network. For instance, the UE can identify when a call setup instruction should be sent to the IMS to cause a communication channel to be established. The UE can determine whether the UE will experience a change to another radio frequency band or radio technology based on test data, and delay sending the call setup instruction for a time period during which the test data can be analyzed.

20 Claims, 7 Drawing Sheets

(56) References Cited

U.S. PATENT DOCUMENTS

| | | | |
|---|---|---|---|
| 2015/0163709 A1* | 6/2015 | Lee | H04W 36/0079 |
| | | | 370/332 |
| 2016/0353340 A1* | 12/2016 | Yang | H04W 36/0058 |
| 2018/0054767 A1* | 2/2018 | Gholmieh | H04W 36/0022 |
| 2020/0275259 A1* | 8/2020 | Zhu | H04W 76/16 |
| 2021/0136645 A1* | 5/2021 | Zhao | H04W 36/30 |
| 2021/0329508 A1* | 10/2021 | Gopal | H04W 72/56 |
| 2022/0053315 A1* | 2/2022 | Wang | H04L 61/2553 |
| 2022/0167244 A1* | 5/2022 | Zaus | H04W 36/08 |
| 2022/0272688 A1* | 8/2022 | Lee | H04W 72/563 |
| 2022/0338154 A1* | 10/2022 | Niemi | H04L 65/1073 |
| 2022/0417798 A1* | 12/2022 | Chinthalapudi | H04L 65/80 |
| 2023/0022707 A1* | 1/2023 | Agarwal | H04L 65/1095 |
| 2023/0188574 A1* | 6/2023 | Keller | H04L 65/65 |
| | | | 370/352 |
| 2023/0276361 A1* | 8/2023 | Yang | H04W 76/27 |
| | | | 370/311 |
| 2023/0344876 A1* | 10/2023 | Liu | H04W 76/10 |
| 2023/0362211 A1* | 11/2023 | Xu | H04L 65/1096 |
| 2023/0388886 A1* | 11/2023 | Huang | H04W 36/30 |
| 2024/0007907 A1* | 1/2024 | Yuan | H04W 36/0022 |
| 2024/0015604 A1* | 1/2024 | Zhang | H04W 76/18 |
| 2024/0015616 A1* | 1/2024 | Wang | H04W 76/30 |
| 2024/0049170 A1* | 2/2024 | Bhatnagar | H04W 4/02 |
| 2024/0056944 A1* | 2/2024 | Lo | H04L 65/1016 |

\* cited by examiner

VOICE CALL SETUP IN A TELECOMMUNICATION SYSTEM

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. Telecommunications systems may include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

A user of a mobile device can initiate a voice communication which triggers a call setup procedure. Before the call setup procedure completes, the mobile device can change to another radio frequency or radio technology subjecting the call setup procedure to potential failure. For example, during fallback from a 5G network to an LTE network, the mobile device can initiate setting up a call with the 5G network but be unable to complete the call setup procedure due to the mobile device entering a geographical area served by the LTE network.

This application describes techniques for establishing voice calls in a telecommunication network by determining when to send an initial connection request. The techniques can include a call setup component of a user equipment (UE) receiving a request to establish a voice communication over a telecommunications network and determining a time period to delay sending the request. The call setup component can access, during the time period, test result(s) indicating a signal strength and/or a signal quality for the UE to send the request using different radio frequencies and/or radio technologies. The call setup component can send the initial call setup request based at least in part on the test results associated with different radio frequency bands and/or radio technologies. By implementing the call setup component, a UE can avoid call setup failures caused by Evolved Packet System Fallback (EPSFB) and/or changes in radio frequency bands.

Generally, the call setup component of the UE can represent functionality to delay a call setup request message from being sent to an Internet Protocol (IP) Multimedia Subsystem (IMS) core of a telecommunication network, (e.g., a 5G network, a 4G network, etc.) for a time period. The call setup component can represent firmware, hardware and/or software to determine which telecommunication network or frequency band receives an initial call setup request (e.g., a Session Initiation Protocol (SIP) INVITE message) for establishing a voice communication. For example, a user can initiate a request for a voice communication (e.g., a Voice over New Radio (VoNR) voice call or a VoNR emergency call) and the call setup component can identify that the request is associated with a call setup instruction for sending to the IMS associated with the telecommunications network. In some examples, the call setup component can pause sending the call setup instruction to the IMS based at least in part on identifying the call setup instruction. The call setup component can also or instead receive one or more test results indicating a signal strength and/or a signal quality of at least one of: a first radio frequency band of a fifth generation (5G) telecommunications network, a second radio frequency band of the 5G telecommunications network, or a third radio frequency band of a fourth generation (4G) telecommunications network. The call setup component can determine whether to send the call setup instruction to an IMS associated with the 5G telecommunications network or an IMS associated with the 4G telecommunications network based at least in part on the one or more test results.

As devices compete for available bandwidth to receive Voice over New Radio (VoNR) and other services over the 5G network, fallback to one or more other networks may occur. In one specific example, a UE can delay sending an initial call setup request for no more than approximately 200 milliseconds to access, compare, or otherwise analyze test results indicating whether fallback to another radio technology or a change to another radio frequency band is likely to occur in the future. In some examples, the UE can send the initial call setup request to either the 5G network or the 4G network based on the test results indicating which network has a stronger signal strength and/or greater signal quality.

In various examples, the call setup component (or other component of the UE) can comprise logic to detect when the UE is likely to change how it receives service in the future. For example, the call setup component can determine which radio frequency band and/or radio technology will have a strongest signal for communicating a voice communication in the future. Using the techniques described herein, the call setup component can initiate, establish, maintain, manage, or otherwise determine call setup messages for sending to a network element (e.g., a base station, etc.) to ensure that the voice communication is setup using a signal that remains active for the duration of the call setup procedure (e.g., the signal does not change during exchange of the call setup messages between the UE and the network element). In some examples, implementing the call setup techniques described herein can avoid scenarios when a user triggers sending a call setup instruction to a base station only to leave a serving range of the base station (or radio frequency) prior to the UE exchanging all the call setup messages required to establish a channel for the voice communication. Additional details for the call setup component of the UE initiating a voice communication can be found throughout this disclosure.

The call setup techniques described herein can enable a UE to determine which available network elements (or radio frequency bands associated therewith) receive an initial request to setup a voice communication. By waiting to send the initial request to setup the voice communication until the call setup component receives test result(s) indicating signal strength and/or signal quality of available network elements and/or radio frequency bands, network bandwidth can be reduced (e.g., compared to automatically sending the initial request responsive to a user initiating the voice communication). Thus, the call setup techniques described herein can be used to interrupt an initial request to setup a voice communication that otherwise results in a voice call failure.

The systems and techniques disclosed herein may provide for processing voice communication requests associated with a UE and delaying setting up a communication channel usable for the voice communication for a period of time. For instance, during fallback to another telecommunications network and/or prior to the UE changing frequency bands, the UE can refrain from transmitting a voice call request until test results indicate a best available radio frequency band or radio technology type for transmitting the voice call. The delay in sending the request can occur for less than 200 milliseconds, for instance, which is imperceivable to a user of the UE while preventing the UE from starting a call setup procedure that would otherwise fail once the UE begins using another radio frequency band or another radio technology type (e.g., the UE would no longer be communicating with the radio frequency band in which the call setup began, and a new call setup process cannot start on the new radio frequency band because the UE is only capable of performing one call setup process at any given time). Further description of providing call setup techniques by the UE can be found throughout this disclosure including in the figures below.

Figure 1:
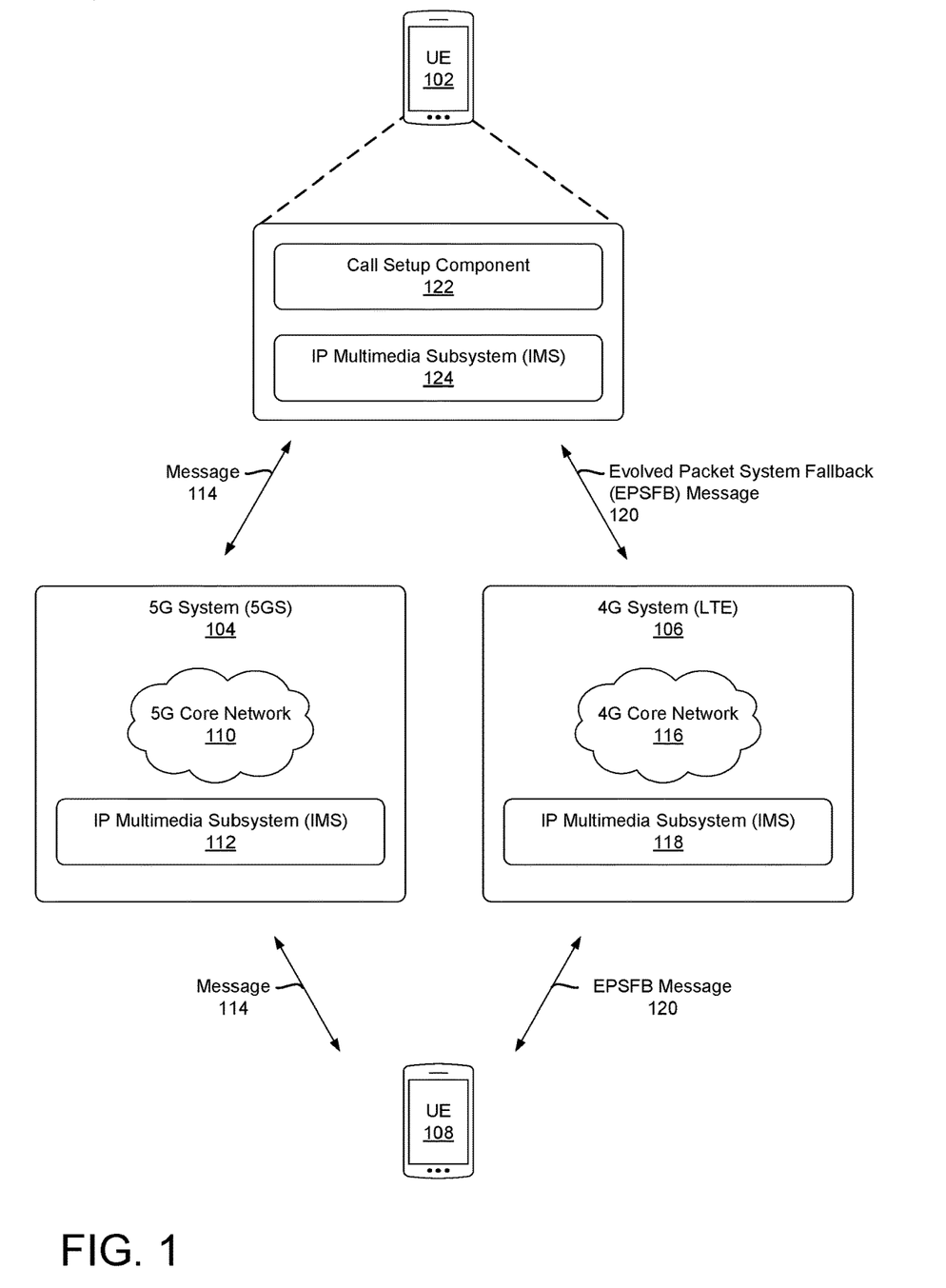
FIG. 1 depicts an example network environment in which an example user equipment (UE) can connect to one of multiple available telecommunications systems to engage in a voice communication.

FIG. 1 depicts an example network environment 100 in which an example user equipment (UE) can connect to one of multiple available telecommunications systems to engage in a voice communication. For example, the UE 102 can connect to a 5G system 104 or a 4G system 106 to exchange a voice communication (e.g., a VoNR communication, an e911 voice communication, etc.) with one or more additional UEs (e.g., UE 108).

The UE 102 and the UE 108 represent any device that can wirelessly connect to the telecommunication network, and in some examples may include a mobile phone such as a smart phone or other cellular phone, a personal digital assistant (PDA), a personal computer (PC) such as a laptop, desktop, or workstation, a media player, a tablet, a gaming device, a smart watch, a hotspot, or any other type of computing or communication device. An example architecture for the UE 102 and UE 108 is illustrated in greater detail in FIG. 7.

As depicted in FIG. 1, the 5G system 104 comprises a 5G core network 110 and an IP Multimedia Subsystem (IMS) 112 (e.g., an IMS core network) for transmitting and/or receiving a message 114 (e.g., a message requesting to setup a communication channel usable by the UE 102 and the UE 108, voice message(s) after the setup of the communication channel, etc.). FIG. 1 also depicts the 4G system 106 comprising a 4G core network 116 and an IMS 118 (e.g., an IMS core network) for transmitting and/or receiving an EPSFB message 120 (e.g., a request to setup a communication channel usable by the UE 102 and the UE 108, voice message(s) after the setup of the communication channel, etc.). In some examples, the UE 102 can initiate a call setup procedure (e.g., an exchange of a plurality of messages that establish the communication channel) with one of: the 5G system 104 or the 4G system 106. For instance, the UE 102 can send the message 114 indicating a request to establish a voice call to the IMS 112 when operating in the 5G core network 110 or send the EPSFB message 120 indicating a request to establish a voice call to the IMS 118 when operating in the 4G core network 116.

FIG. 1 shows the UE 102 comprising a call setup component 122 and an IMS 124 to implement the call setup techniques described herein. The call setup component 122 can represent functionality to initiate, manage, or otherwise complete a call setup procedure that results in establishing the voice call for the UE 102. In some examples, the call setup component 122 can identify, detect, or otherwise determine that the UE 102 is generating a request to establish a voice call (e.g., a Voice over New Radio (VoNR) communication over the 5G core network 110 or a voice call over the 4G core network 116) to the IMS 112 or the IMS 118. For instance, responsive to a user of the UE 102 attempting to contact the UE 108, the IMS 124 of the UE 102 can generate a call setup instruction usable by the IMS 112 or the IMS 118 to establish the voice call.

In some examples, the call setup component 122 can interrupt, refrain, or otherwise delay sending the call setup instruction to the IMS 112 or the IMS 118 for a time period. For example, the call setup component 122 can pause sending the call setup instruction based at least in part on identifying or detecting the request to establish the voice call (e.g., the call setup component 122 can detect that the IMS 124 responsible for sending the call setup instruction to an IMS of a corresponding telecommunications system). Thus, instead of automatically sending the call setup instruction to the IMS 112 or the IMS 118 associated with the core network on which the UE 102 currently receives service, the call setup component 122 can delay the voice call for the time period (e.g., less than a few hundred milliseconds and therefore imperceivable to the user of the UE 102).

During pausing of the call setup instruction from being sent from the IMS 124, the call setup component 122 can determine a test result that indicates a signal strength and/or a signal quality of one or more radio frequency bands of the 5G core network 110 and/or the 4G core network 116. In some examples, the call setup component 122 can receive a test result(s) that comprises a strength measurement of available radio frequency bands to determine which core network the UE 102 is likely to receive service from in the future. The test result(s) can be received from another component of the UE 102 (e.g., a modem, a memory, the IMS 124, etc.) that stores measured test data as a result of performing a test.

In some examples, the call setup component 122 can determine a likelihood for Evolved Packet System Fallback (EPSFB) from the 5G system 104 to the 4G system 106 based at least in part on the test result(s). Additionally, or alternatively, the call setup component 122 can determine a probability for the voice call (e.g., a VoNR communication) to change to another radio frequency band or another radio technology at a future time based at least in part on the test result(s). For example, the test result can indicate whether an Inter Frequency Hand Over and/or an Inter Radio Access Technology handover is likely to occur in the future. In some examples, the test results can include, for example, one or more of: a Reference Signal Received Power measurement, a Received Signal Strength Indicator measurement, or a Reference Signal Received Quality measurement.

In various examples, the test result(s) can be associated with one or more tests that take place prior to the UE 102 receiving the request for a voice call (e.g., a test that occurs at regular intervals or a predetermined time to ensure signal quality). The test result(s) can also, or instead, be associated with one or more tests that are generated based at least in part on the call setup component 122 identifying generation of the call setup instruction by the IMS 124. Further description of the test result(s) are discussed throughout this disclosure including in the following figures.

The call setup component 122 can, in some examples, determine that the 5G system 104 or the 4G system 106 (or another available telecommunication system) has a higher signal strength and/or signal quality, and send the call setup instruction to the IMS 112 or the IMS 118 based at least in part on the test result(s) indicating which of the 5G system 104 or the 4G system 106 is associated with the higher signal strength and/or higher signal quality. In some examples, the call setup component 122 can compare a test result of a test associated with the 5G system 104 to a test result associated with the 4G system 106, and send the call setup instruction based at least in part on the comparison. In some examples, the call setup instruction can comprise a Session Initiation Protocol (SIP) INVITE message.

The IMS 124 of the UE 102 is configured to generate, communicate, or otherwise establish a communication session usable for the UE 102 to exchange a voice call or other data with another UE (e.g., the UE 108). In various examples, the 5G system 104 can initiate, establish, maintain, format, augment, manage, or otherwise determine secure exchange of text, video, and/or photos including determining whether the UE 102 undergoes fallback (e.g., EPSFB) to communicate with the UE 108. In some examples, the IMS 124 can determine that a change in technology from the 5G system 104 to the 4G system 106 (or vice versa) improves a signal strength and/or signal quality for the UE 102, such as during Evolved Packet System Fallback.

In various examples, the techniques described herein can include the UE 102 implementing the call setup component 122 to determine a time period to delay sending the call setup instruction to the IMS 112 or the IMS 118. The time period can vary over time based at least in part on analysis of previous time periods by a machine learned model trained to minimize an amount of time that the UE 102 waits before sending the call setup instruction. Using a machine learned model to determine the time period can reduce the time period and therefore minimize an ability for the user of the UE 102 to perceive the delay. In other words, the call setup component 122 can adjust the time period over time to account for accessing and/or performing various tests while the user waits to establish a call. In some examples, the machine learned model can identify which tests provide the best indication of a possible change of service, and determine the time period based on the identified tests.

To implement the techniques described herein, in various examples the 5G system 104 and/or the IMS 112 can include one or more of: an a proxy call session control function (PCSCF), an interrogating call session control function (ICSCF), a serving call session control function (SCSCF), a serving gateway (SGW), a packet data network gateway (PGW), a policy and charging rules function (PCRF), and an internet protocol short message gateway (IPSM-GW), a short message service center (SMSC), and an evolved packet data gateway (ePDG) 328, and a Home Subscriber Server (HSS), just to name a few. In addition, the techniques described herein may be implemented using Real-Time Protocol (RTP) and/or Real-Time Control Protocol (RTCP), among others.

In various examples, the 5G system 104 can represent functionality to provide communications between the UE 102 and the UE 108, and can include one or more radio access networks (RANs), as well as one or more core networks linked to the RANs. For instance, a UE 102 can wirelessly connect to a base station or other access point of a RAN, and in turn be connected to the 5G core network 110. The RANs and/or core networks can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, third generation (3G) technology, High-Speed Data Packet Access (HSDPA)/Evolved High-Speed Packet Access (HSPA+) technology, Universal Mobile Telecommunications System (UMTS) technology, Global System for Mobile Communications (GSM) technology, WiFi technology, and/or any other previous or future generation of radio access technology. In this way, the 5G system 104 is compatible to operate with other radio technologies including those of other service providers. Accordingly, the message 114 from the UE 102 may originate with another service provider (e.g., a third-party) and be processed by the IMS 124 independent of the technolog(ies) or core network associated with the service provider.

In some examples, the 5G core network 110 can represent a service-based architecture that includes multiple types of network functions that process control plane data and/or user plane data to implement services for the UE 102. In some examples, the services comprise rich communication services (RCS), a VoNR service, a ViNR service, and the like which may include a text, a data file transfer, an image, a video, or a combination thereof. The network functions of the 5G core network 110 can include an Access and Mobility Management Function (AMF), a Session Management Function (SMF), a User Plane Function (UPF), a Policy Control Function (PCF), and/or other network functions implemented in software and/or hardware, just to name a few. Examples of network functions are also discussed in relation to FIG. 2, and elsewhere.

Figure 2:
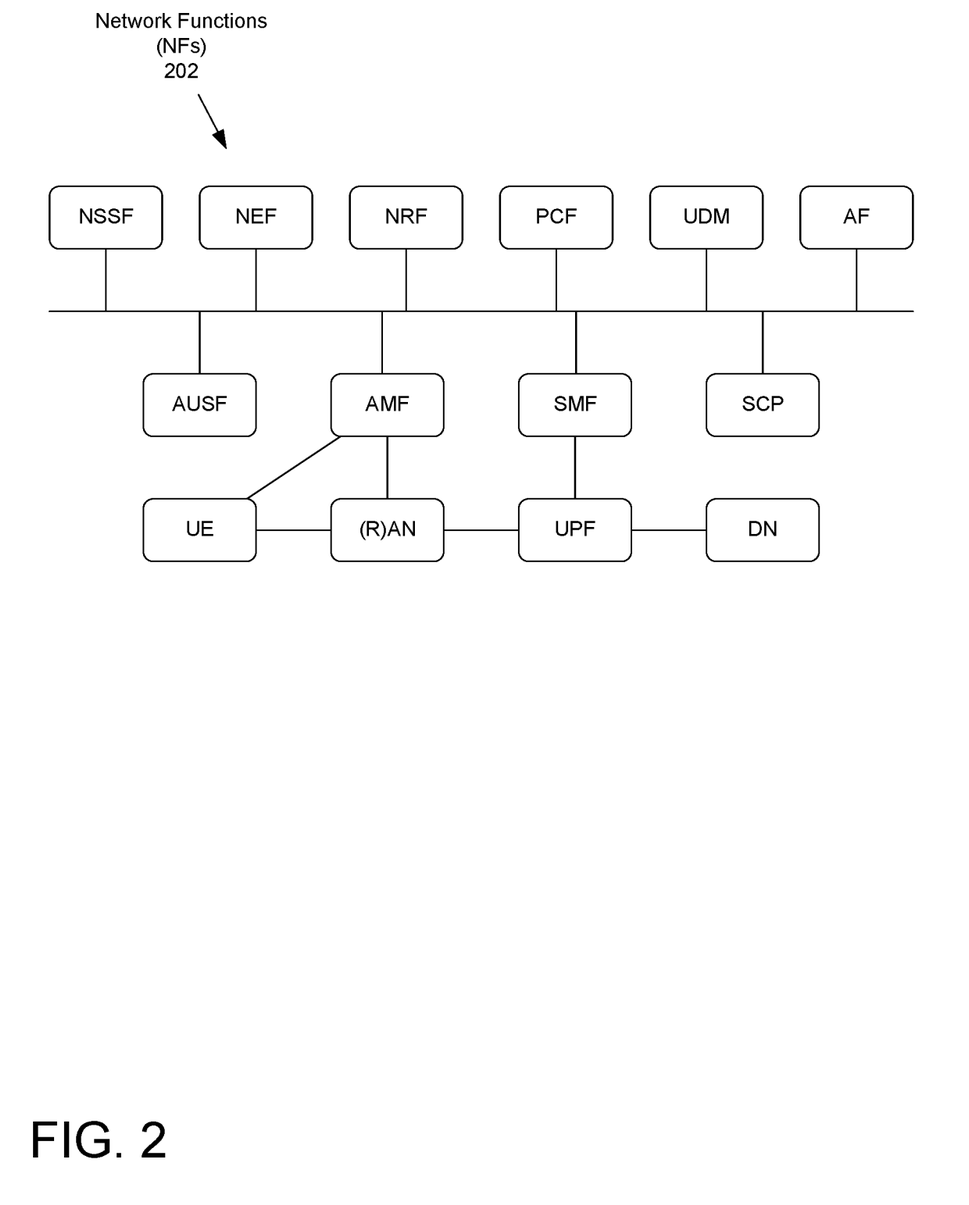
FIG. 2 depicts an example system architecture for a fifth generation (5G) telecommunication network.

FIG. 2 depicts an example system architecture for a fifth generation (5G) telecommunication network. In some examples, the telecommunication network can comprise the 5G core network 110 in FIG. 1 that includes a service-based system architecture in which different types of network functions (NFs) 202 operate alone and/or together to implement services. Standards for 5G communications define many types of NFs 202 that can be present in 5G telecommunication networks (e.g., the 5G core network 110), including but not limited to an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP InterWorking Function (N3IWF), Trusted Non-3GPP Gateway Function (TNGF), and Wireline Access Gateway Function (W-AGF), many of which are shown in the example system architecture of FIG. 2.

One or more of the NFs 202 of the 5G network 110 can be implemented as network applications that execute within containers (not shown). 5G NFs 202 can execute as hardware elements, software elements, and/or combinations of the two within telecommunication network(s), and accordingly many types of 5G NFs 202 can be implemented as software and/or as virtualized functions that execute on cloud servers or other computing devices. Network applications that can execute within containers can also include any other type of network function, application, entity, module, element, or node.

The 5G core network 110 can, in some examples, determine a connection between an IMS that manages a communication session for the UE 102, including sessions for short messaging, voice calls, video calls, and/or other types of communications. For example, the IMS 124 of the UE 102 and the IMS 112 of the 5G system 104 (or the IMS 118) can exchange Session Initiation Protocol (SIP) messages to set up and manage individual communication sessions. In some examples, the IMS 112 can generate a communication channel for a voice communication between the UE 102 and the UE 108.

Figure 3:
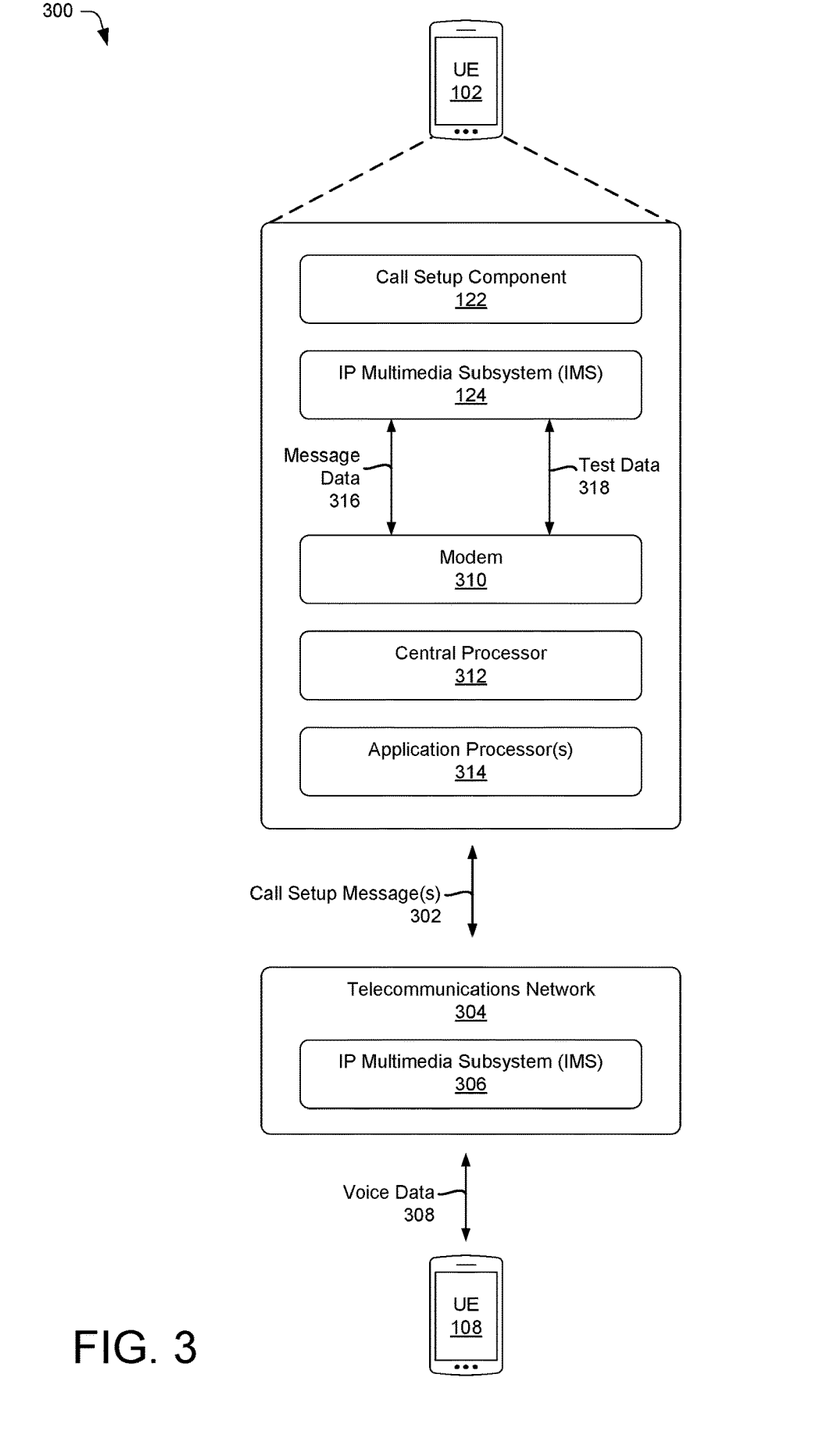
FIG. 3 depicts an example user equipment (UE) implementing call setup techniques to establish a voice call in an example telecommunication network.

FIG. 3 depicts an example user equipment implementing call setup techniques to establish a voice call in an example telecommunication network. For example, the UE 102 may exchange (e.g., send and/or receive) one or more call setup messages 302 with a telecommunications network 304 that includes an IMS 306. The IMS 306 can determine a communication channel for a call initiated by the UE 102, and configure voice data 308 for sending to the UE 108 using the communication channel. In various examples, the call setup techniques described herein can be implemented by implementing one or more of: the call setup component 122, the IMS 124, a modem 310, a central processor 312, and one or more application processor(s) 314.

In various examples, the one or more call setup messages 302 (also referred to as the call setup message 302) can comprise a call setup instruction, a reply to the call setup instruction, a test message, or other message usable to connect the UE 102 and the UE 108 for voice communication. The call setup instruction can include, for example, a Session Initiation Protocol (SIP) INVITE message or other message requesting a communication channel from an IMS.

In some examples, the telecommunications network 304 can represent the 5G system 104 or the 4G system 106. As such, the IMS 306 can represent one of: the IMS 112 or the IMS 118. For example, the UE 102 may initiate a call for voice service while receiving a signal from the 5G core network 110 or from the 4G core network 116. The UE 102 may change to another radio frequency (e.g., 600 MHz, 1.9 GHz, 2.5 GHz, etc.) and/or radio technology (e.g., 5G New Radio, 4G LTE, 3G, etc.) depending upon a strength of, or quality of, the radio frequency bands or radio technologies available to serve the UE 102. For example, the UE 102 may fallback from the 5G system 104 to the 4G system 106, and the fallback may occur after the UE generates a call setup instruction. In some examples, the call setup component 122 can determine that the UE 102 generated the call setup message 302, and cause the UE 102 to refrain from sending the call setup message 302 to the IMS 306 for a period of time.

As FIG. 3 depicts, the UE 102 can include the central processor 312 (e.g., a central processing unit) and the application processor(s) 314 to process data associated with the call setup component 122, the IMS 124, and/or the modem 310, just to name a few. In some examples, the data can include message data 316 and test data 318. While FIG. 3 shows the message data 316 and the test data 318 as exchanging between the IMS 124 and the modem 310, it is understood that the message data 316 and/or the test data 318 can also or instead be exchanged between the call setup component 122, the IMS 124, the modem 310, one or more memories associated with the UE 102, another component of the UE 102, or a component of the telecommunications network 304 (e.g., an IMS, a base station or other network element), just to name a few.

The message data 316 can comprise data indicating a request to send a call setup instruction initiated by, or stored at, the modem 310 and/or the IMS 124. The test data 318 can represent test measurements representing signal information (e.g., signal strength and/or signal quality) of one or more radio frequencies associated with the telecommunications network 304 (and in some examples an additional telecommunications network). For example, the test data 318 can represent signal information associated with a radio frequency, a base station, a transceiver, an antennae, and the like. The test data 318 may be associated with one or more tests conducted at a time before the UE 102 receives a call setup request from a user and/or a time after the UE receives the call setup request. The test data 318 may also or instead be accessed from a memory of the UE 102 and/or a memory remote from the UE 102 (e.g., a memory of a base station).

Generally, the test data 318 can represent a signal strength measurement or signal quality measurement performed by the UE 102 and/or the telecommunications network 304). The test data 318 can be a test result associated with a test or event indicating that: signal strength of a serving node (e.g., base station, etc.) becomes better than a threshold, signal strength of the serving node becomes worse than a threshold, a neighboring serving node becomes better than a threshold, the neighboring serving node becomes worse than a threshold, a new radio neighboring serving node becomes better than a threshold, the new radio neighboring serving node becomes worse than a threshold, and/or an Inter Radio Access Technology neighbor becomes better than a threshold.

In some examples, the test data 318 may, for example, be associated with a measurement of an Inter Frequency Hand Over event and/or an Inter Radio Access Technology event. The test data 318 can, in various examples, represent one or more of: a Reference Signal Received Power measurement, a Received Signal Strength Indicator measurement, or a Reference Signal Received Quality measurement.

In some examples, a user initiates a voice communication at the UE 102 resulting in the modem 310 and/or the IMS 124 sending the message data 316 and/or the test data 318 to the call setup component 122 for processing. The call setup component 122 can, for example, determine a time period to delay the call setup message 302 based at least in part on the message data 316 and/or the test data 318. The call setup component 122 can send the call setup message 302 to the IMS 306 of the telecommunications network 304 based at least in part on an expiration of the time period or after processing the test results (e.g., comparing test results of different radio frequencies and/or different telecommunications networks).

Though the call setup component 122, the IMS 124, and the modem 310 are illustrated in FIG. 3 individually, it is understood that the call setup component 122, the IMS 124, and/or the modem 310 (or functionality provided therefrom) may be directly coupled to and/or integrated into the IMS 124, the modem 310, or other sub-system of the UE 102. In one specific example, the call setup techniques described herein can be implemented as logic (e.g., programmable code) stored in the IMS 124.

Figure 4:
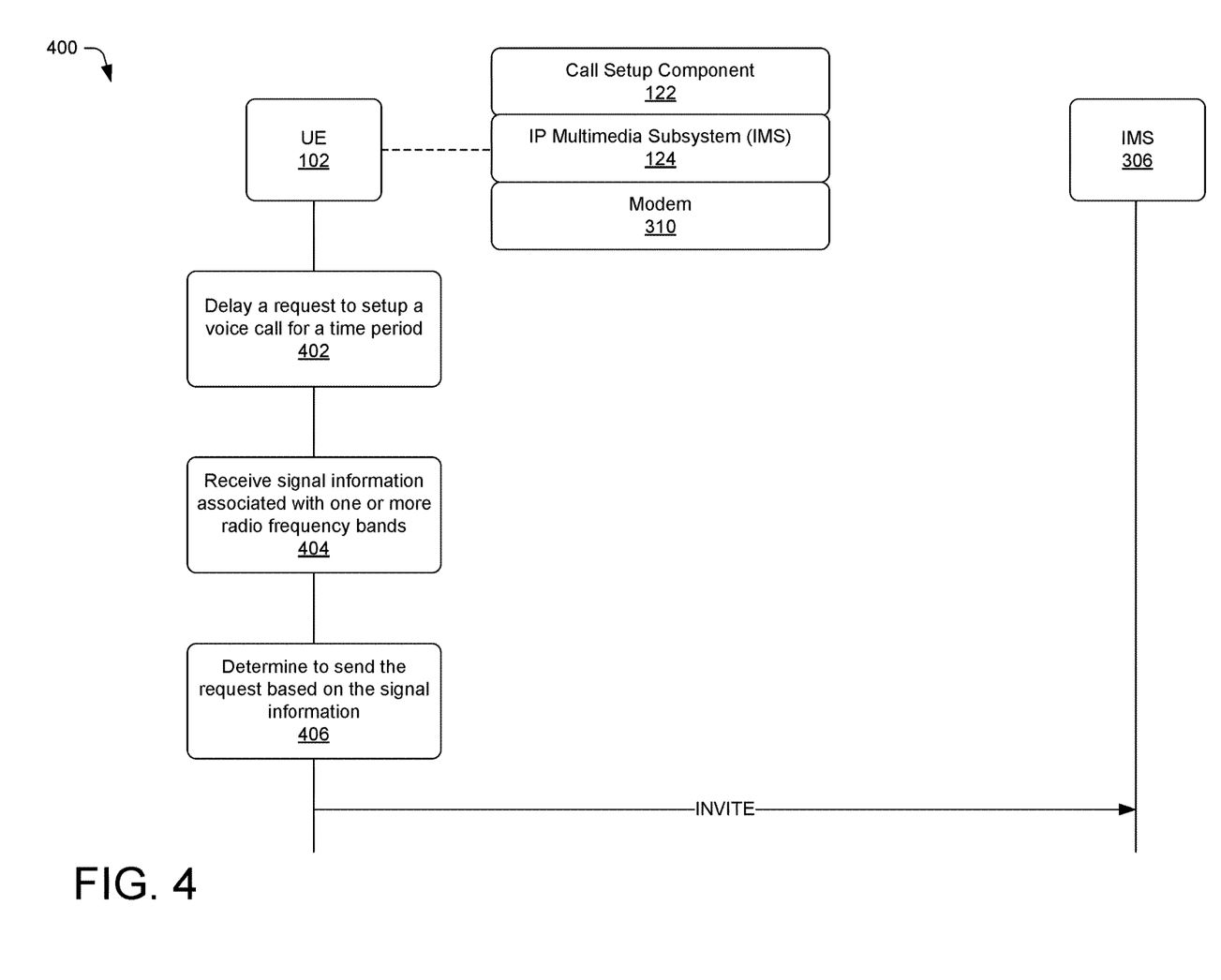
FIG. 4 depicts another example user equipment (UE) implementing call setup techniques to establish a voice call in an example telecommunication network.

FIG. 4 depicts another example user equipment (e.g., the UE 102) implementing call setup techniques to establish a voice call in an example telecommunication network (e.g., the telecommunication network 304). For instance, the UE 102 can initiate a voice communication to another UE using the 5G core network 110 or the 4G core network 116.

At 402, the UE 102 can delay a request to setup a voice call for a time period. For instance, the call setup component 122, the IMS 124, and/or the modem 310 can detect that a user of the UE 102 wants to send a voice message to another device, and pause an associated call setup instruction. The time period may be between 10 milliseconds and 200 milliseconds such that the user is unaware of the delay.

At 404, the UE 102 can receive signal information associated with one or more radio frequency bands. In some examples, the signal information can represent a value indicating a probability for the UE 102 to experience fallback to another network, a strength of each of the radio frequency bands, and/or a quality of each of the radio frequency bands. In some examples, the radio frequency bands can be associated with a network (e.g., the 5G core network 110) that the UE 102 currently receives service from, or another network that may have a stronger signal, such as a 4G core network 116.

At 406, the UE 102 can determine to send the request to setup the call (or associated call setup instruction) based at least in part on the signal information. For example, the call setup component 122 of the UE 102 can send an invite message to the IMS 112 of the 5G core network 110 or the IMS 118 of 4G core network 116, based on which core network is associated with the stronger and/or higher quality signal at a given time. Based at least in part on the determination to send the request, an INVITE message can be sent by the modem 310 to a corresponding IMS. By delaying the sending of the request for the voice call, the UE 102 can identify the best available frequency, technology, etc. for communicating the voice call while ensuring that the call setup message does not initiate on a first core network and risk call failure due to not being able to complete the call set up procedure before the UE 102 "moves" to another network. Thus, implementing the techniques described herein can avoid customer frustration due to a call setup failure and/or reduce an amount of data processing over a computer network (e.g., fewer messages are sent over the network).

Figure 5:
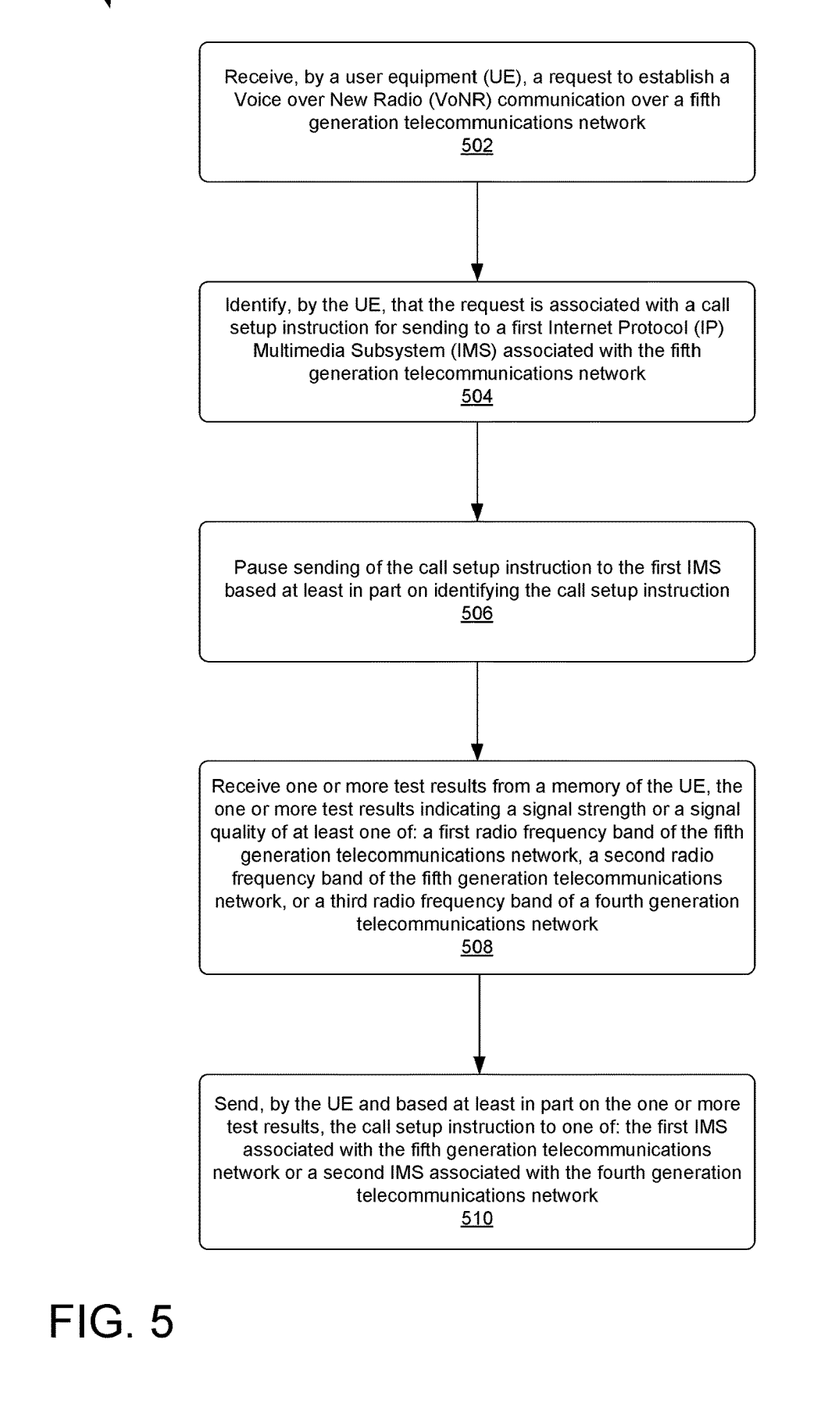
FIG. 5 depicts a flowchart of an example process for establishing a voice call for an example user equipment.

FIG. 5 depicts a flowchart of an example process 500 for establishing a voice call for an example user equipment. Some or all of the process 500 may be performed by one or more components in FIGS. 1-3, as described herein. For example, some or all of process 500 may be performed by the call setup component 122, the IMS 124, and/or the modem 310.

At operation 502, the process may include receiving, by a user equipment (UE), a request to establish a Voice over New Radio (VoNR) communication over a fifth generation telecommunications network. In some examples, the operation 502 may include the IMS 124 receiving the message data 316 indicating that a user initiated a voice call (e.g., a VoNR communication) to another UE.

At operation 504, the process may include identifying, by the UE, that the request is associated with a call setup instruction for sending to a first Internet Protocol (IP) Multimedia Subsystem (IMS) associated with the fifth generation telecommunications network. For instance, the IMS 124 can determine that the message data 316 is associated with sending an initial invite to join a core network (e.g., the 5G core network 110). In various examples, the IMS 124 can detect that the UE 102 will generate, or has generated, a call setup instruction for sending to the IMS 112 of the 5G system 104.

At operation 506, the process may include pausing sending of the call setup instruction to the first IMS based at least in part on identifying the call setup instruction. In some examples, the operation 506 may include the call setup component 122 determining a time period to refrain from sending the call setup instruction to the IMS 112.

At operation 508, the process may include receiving one or more test results from a memory of the UE, the one or more test results indicating a signal strength or a signal quality of at least one of: a first radio frequency band of the fifth generation telecommunications network, a second radio frequency band of the fifth generation telecommunications network, or a third radio frequency band of a fourth generation telecommunications network. In some examples, the operation 508 may include the IMS 124 and/or the call setup component 122 accessing, receiving, or otherwise determining test result(s) (e.g., the test data 316) associated with the UE 102 from a memory, a database, or other storage device associated with the UE 102. In some examples, the operation 508 may include the IMS 124 and/or the modem 310 initiating a request for signal information from a network element or other component of the 5G core network 110.

At operation 510, the process may include sending, by the UE and based at least in part on the one or more test results, the call setup instruction to one of: the first IMS associated with the fifth generation telecommunications network or a second IMS associated with the fourth generation telecommunications network. In some examples, the operation 510 may include the UE 102 sending an INVITE instruction to the IMS 112 or the IMS 118, whichever is associated with the greatest signal strength and/or signal quality (as indicated by the test results). In some examples, the call setup component 122 can compare test result(s) one to another and/or to a test threshold to determine whether to establish the voice communication with the 5G system 104 or the 4G system 106.

Figure 6:
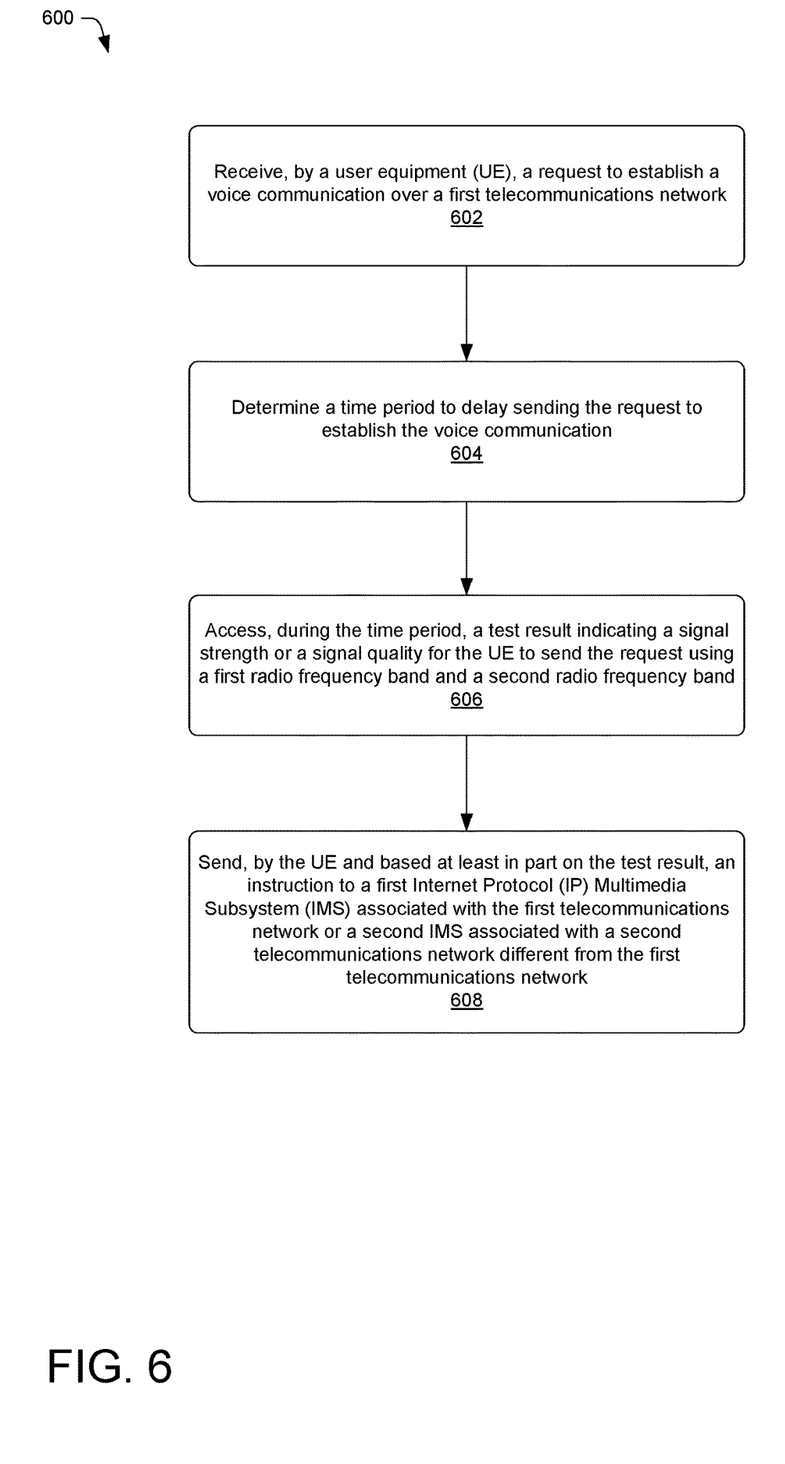
FIG. 6 depicts another flowchart of an example process for establishing a voice call for an example user equipment.

FIG. 6 depicts another flowchart of an example process 600 for establishing a voice call for an example user equipment. Some or all of the process 600 may be performed by one or more components in FIGS. 1-3, as described herein. For example, some or all of process 600 may be performed by the call setup component 122, the IMS 124, and/or the modem 310.

At operation 602, the process may include receiving, by a user equipment (UE), a request to establish a voice communication over a first telecommunications network. In some examples, the operation 602 may include detecting that the UE 102 received a request to establish a voice communication with another UE over a 5G network, a 4G network, a 3G network, or the like. For instance, the call setup component 122 can identify that a call setup instruction is being generated at the UE 102 for sending to an IMS over the telecommunications network.

At operation 604, the process may include determining a time period to delay sending the request to establish the voice communication. In some examples, the operation 604 may include the call setup component 122 determining a time period to delay sending the call setup instruction (e.g., an INVITE instruction) to the IMS 306.

At operation 606, the process may include accessing, during the time period, a test result indicating a signal strength or a signal quality for the UE to send the request using a first radio frequency band and a second radio frequency band. In some examples, the operation 606 may include the call setup component 122 accessing, receiving, or otherwise determining test results associated with one or more tests or events. In some examples, the call setup component 122 can receive the test data 318 from the modem 310, or other component or memory of the UE 102 and/or the telecommunication network. The test data 318 may, for instance, be stored on the UE 102 after a test to measure signal strength or signal quality of the UE 102 relative to a radio frequency band and/or a radio technology type.

At operation 608, the process may include sending, by the UE and based at least in part on the test result, an instruction to a first Internet Protocol (IP) Multimedia Subsystem (IMS) associated with the first telecommunications network or a second IMS associated with a second telecommunications network different from the first telecommunications network. In some examples, the operation 608 may include the call setup component 122 determining whether to send the call setup instruction to the IMS 112 of the 5G system 104 or the IMS 118 of the 4G system 106 based at least in part on the test data 318.

Figure 7:
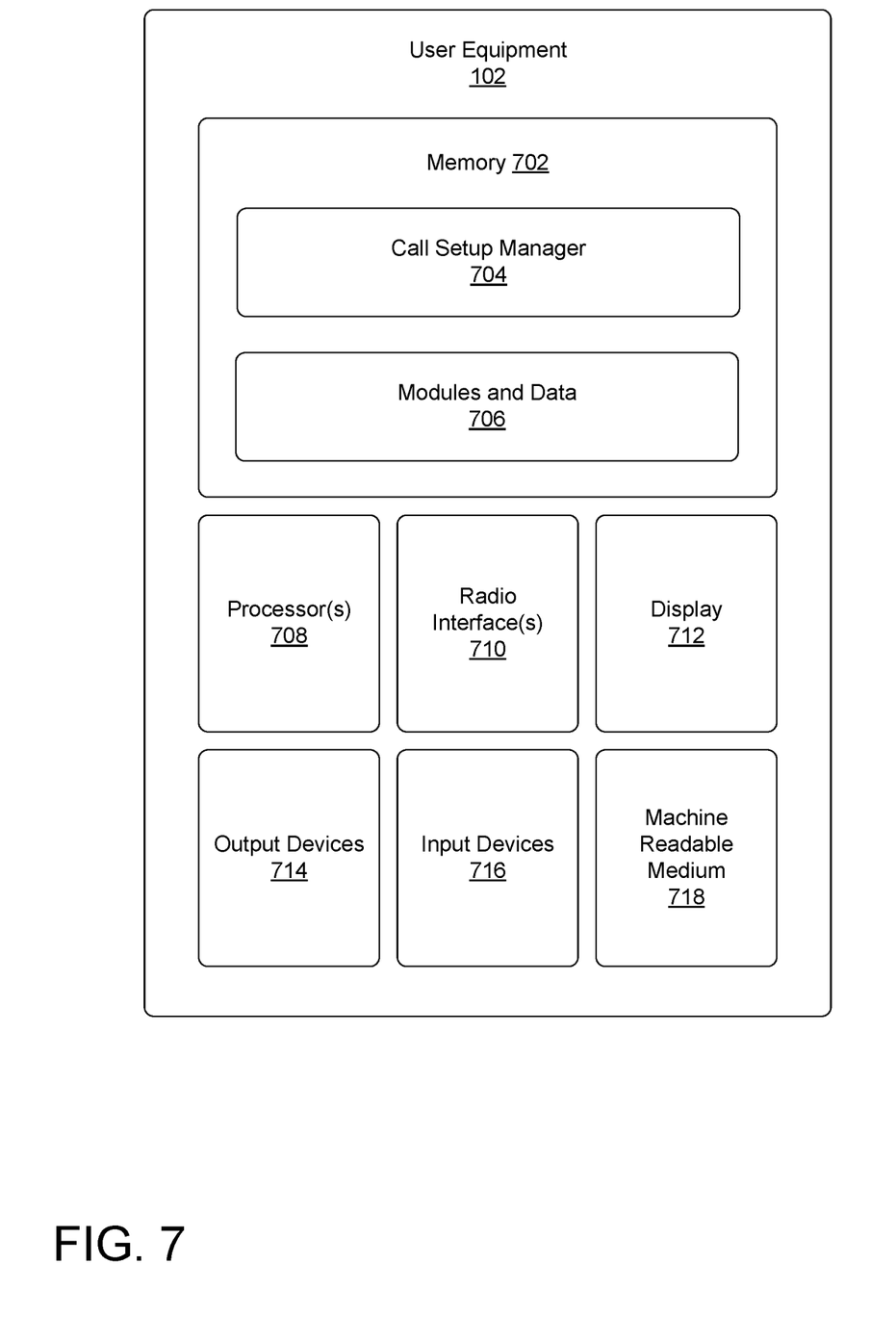
FIG. 7 depicts an example system architecture for a user equipment.

FIG. 7 depicts an example system architecture for a UE 102, in accordance with various examples. As shown, a UE 102 can have memory 702 storing a call setup manager 704, and other modules and data 706. A UE 102 can also comprise processor(s) 708, radio interfaces 710, a display 712, output devices 714, input devices 716, and/or a machine readable medium 718.

In various examples, the memory 702 can include system memory, which may be volatile (such as RAM), non-volatile (such as ROM, flash memory, etc.) or some combination of the two. The memory 702 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the UE 102. Any such non-transitory computer-readable media may be part of the UE 102.

The call setup manager 704 can send and/or receive messages comprising a VoNR service, a ViNR service, and/or an RCS service including SIP messages associated with setup and management of a call session via the IMS. The SIP messages can include an SIP INVITE message and/or other SIP messages.

The other modules and data 706 can be utilized by the UE 102 to perform or enable performing any action taken by the UE 102. The modules and data 706 can include a UE platform, operating system, and applications, and data utilized by the platform, operating system, and applications.

In various examples, the processor(s) 708 can be a central processing unit (CPU), a graphics processing unit (GPU), or both CPU and GPU, or any other type of processing unit. Each of the one or more processor(s) 708 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 708 may also be responsible for executing all computer applications stored in the memory 702, which can be associated with common types of volatile (RAM) and/or nonvolatile (ROM) memory.

The radio interfaces 710 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the radio interfaces 710 can be compatible with multiple radio access technologies, such as 5G radio access technologies and 4G/LTE radio access technologies. Accordingly, the radio interfaces 710 can allow the UE 102 to connect to the 5G system 104 described herein.

The display 712 can be a liquid crystal display or any other type of display commonly used in UEs. For example, display 712 may be a touch-sensitive display screen, and can then also act as an input device or keypad, such as for providing a soft-key keyboard, navigation buttons, or any other type of input. The output devices 714 can include any sort of output devices known in the art, such as the display 712, speakers, a vibrating mechanism, and/or a tactile feedback mechanism. Output devices 714 can also include ports for one or more peripheral devices, such as headphones, peripheral speakers, and/or a peripheral display. The input devices 716 can include any sort of input devices known in the art. For example, input devices 716 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 718 can store one or more sets of instructions, such as software or firmware, that embodies any one or more of the methodologies or functions described herein. The instructions can also reside, completely or at least partially, within the memory 702, processor(s) 708, and/or radio interface(s) 710 during execution thereof by the UE 102. The memory 702 and the processor(s) 708 also can constitute machine readable media 718.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein. For instance, techniques described in FIGS. 5 and 6 can be combined in various ways.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
    receiving, by a user equipment (UE), a request to establish a Voice over New Radio (VoNR) communication over a fifth generation telecommunications network;
    identifying, by the UE, that the request is associated with a call setup instruction for sending to a first Internet Protocol (IP) Multimedia Subsystem (IMS) associated with the fifth generation telecommunications network;
    pausing sending of the call setup instruction to the first IMS based at least in part on identifying the call setup instruction;
    receiving one or more test results from a memory of the UE, the one or more test results indicating a signal strength or a signal quality of at least one of: a first radio frequency band of the fifth generation telecommunications network, a second radio frequency band of the fifth generation telecommunications network, or a third radio frequency band of a fourth generation telecommunications network; and
    sending, by the UE and based at least in part on the one or more test results, the call setup instruction to one of: the first IMS associated with the fifth generation telecommunications network or a second IMS associated with the fourth generation telecommunications network.

2. The method of claim 1, wherein the pausing comprises:
    determining a time period to delay sending the call setup instruction to the first IMS; and
    refraining from sending the call setup instruction until one of: an expiration of the time period or the receiving of the one or more test results.

3. The method of claim 1, wherein:
    the call setup instruction comprises a Session Initiation Protocol (SIP) INVITE message, and
    the VoNR communication comprises a VoNR voice call or a VoNR emergency call.

4. The method of claim 1, wherein:
    the first IMS associated with the fifth generation telecommunications network is remote from the UE, and
    the UE comprises an IMS component configured to generate a Session Initiation Protocol message for sending to the first IMS or the second IMS.

5. The method of claim 1, wherein the UE is a first UE, and further comprising:
    determining, based at least in part on the one or more test results, a likelihood for Evolved Packet System Fallback (EPSFB) from the fifth generation telecommunications network to the fourth generation telecommunications network; and
    sending the call setup instruction to the second IMS associated with the fourth generation telecommunications network after completion of the EPSFB.

6. The method of claim 1, further comprising:
    determining, based at least in part on the one or more test results, a probability for the VoNR communication to change to another radio frequency band or another radio technology at a future time, and
    sending the call setup instruction to the first IMS associated with the fifth generation telecommunications network or the second IMS associated with the fourth generation telecommunications network is further based at least in part on the probability.

7. The method of claim 1, wherein:
    the one or more test results identify an Inter Frequency Hand Over or an Inter Radio Access Technology handover, and
    sending the call setup instruction to the first IMS or the second IMS is further based at least in part on completion of the Inter Frequency Hand Over or the Inter Radio Access Technology handover.

8. The method of claim 1, wherein the one or more test results include one or more of: a Reference Signal Received Power measurement, a Received Signal Strength Indicator measurement, or a Reference Signal Received Quality measurement.

9. The method of claim 1, wherein the one or more test results include a first test result associated with the first radio frequency band of the fifth generation telecommunications network and a second test result associated with the third radio frequency band of the fourth generation telecommunications network, and further comprising:
    determining which of the first test result or the second test result has a higher signal strength or signal quality; and
    one of:
        sending the call setup instruction to the first IMS associated with the fifth generation telecommunications network based at least in part on the first test result being the higher signal strength or signal quality, or sending the call setup instruction to the second IMS associated with the fourth generation telecommunications network based at least in part on the second test result being the higher signal strength or signal quality.

10. A system comprising:

one or more processors; and memory storing computer-executable instructions that, when executed by the one or more processors, cause the system to perform operations comprising:

receiving, by a user equipment (UE), a request to establish a voice communication over a first telecommunications network;

identifying, by the UE, that the request is associated with a call setup instruction for sending to a first Internet Protocol (IP) Multimedia Subsystem (IMS) associated with the first telecommunications network;

pausing sending the call setup instruction to the first IMS based at least in part on identifying the call setup instruction; and sending, by the UE and based at least in part on one or more test results, the call setup instruction to the first IMS associated with the first telecommunications network or a second IMS associated with a second telecommunications network different from the first telecommunications network.

11. The system of claim 10, the operations further comprising:

determining, by the UE, the one or more test results based at least in part on identifying the call setup instruction, the one or more test results indicating a signal strength of at least one of: a first radio frequency band of the first telecommunications network, a second radio frequency band of the first telecommunications network, or a third radio frequency band of a second telecommunications network.

12. The system of claim 10, wherein the pausing comprises:

determining a time period to delay sending the call setup instruction to the first IMS; and refraining from sending the call setup instruction.

13. The system of claim 12, wherein the one or more test results include a first test result and a second test result, and the operations further comprising:

comparing the first test result to the second test result;

sending the call setup instruction to the first IMS associated with the first telecommunications network or the second IMS associated with the second telecommunications network is further based at least in part on one of: completion of the time period or the comparing.

14. The system of claim 10, wherein:

the first telecommunications network is a fifth generation telecommunications network, the second telecommunications network is a fourth generation telecommunications network, the call setup instruction comprises a Session Initiation Protocol (SIP) INVITE message, and the voice communication comprises a Voice over New Radio (VoNR) voice call or a VoNR emergency call.

15. The system of claim 10, the operations further comprising:

determining, based at least in part on the one or more test results, a probability for the voice communication to change to another radio frequency band or another radio technology at a future time, and sending the call setup instruction to the first IMS associated with the first telecommunications network or the second IMS associated with the second telecommunications network is further based at least in part on the probability.

16. A non-transitory computer storage medium having programming instructions stored thereon that, when executed by a user equipment (UE), cause the UE to perform operations comprising:

receiving a request to establish a voice communication over a first telecommunications network;

identifying that the request is associated with a call setup instruction for sending to a first Internet Protocol (IP) Multimedia Subsystem (IMS) associated with the first telecommunications network;

pausing sending of the call setup instruction to the first IMS based at least in part on identifying the call setup instruction;

accessing, while the sending of the call setup instruction is paused, a test result indicating a signal strength or a signal quality for the UE to send the request using a first radio frequency band and a second radio frequency band; and sending, based at least in part on the test result, the call setup instruction to the first IMS associated with the first telecommunications network or a second IMS associated with a second telecommunications network different from the first telecommunications network.

17. The non-transitory computer storage medium of claim 16, wherein:

the first radio frequency band is associated with the first telecommunications network, and the second radio frequency band is associated with the second telecommunications network.

18. The non-transitory computer storage medium of claim 16, wherein the operations further comprise:

determining, based at least in part on the test result, a probability for the voice communication to change from the first radio frequency band to the second radio frequency band at a future time, wherein sending the call setup instruction to the first IMS associated with the first telecommunications network or the second IMS associated with the second telecommunications network is further based at least in part on the probability.

19. The non-transitory computer storage medium of claim 16, wherein the instruction comprises a Session Initiation Protocol (SIP) INVITE message.

20. The non-transitory computer storage medium of claim 16, wherein the pausing is for a time period less than 200 milliseconds.

* * * * *